(12) United States Patent
Cranga

(10) Patent No.: US 9,926,074 B2
(45) Date of Patent: Mar. 27, 2018

(54) SKID LANDING GEAR HAVING AT LEAST ONE DAMPER, AND AIRCRAFT INCLUDING THE SKID LANDING GEAR

(71) Applicant: AIRBUS HELICOPTERS, Marignane (FR)

(72) Inventor: Paul Cranga, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 117 days.

(21) Appl. No.: 14/963,399

(22) Filed: Dec. 9, 2015

(65) Prior Publication Data
US 2016/0167773 A1 Jun. 16, 2016

(30) Foreign Application Priority Data
Dec. 11, 2014 (FR) ...................................... 14 02813

(51) Int. Cl.
*B64C 25/60* (2006.01)
*B64C 25/52* (2006.01)
*B64C 25/32* (2006.01)

(52) U.S. Cl.
CPC .............. *B64C 25/60* (2013.01); *B64C 25/52* (2013.01); *B64C 2025/325* (2013.01)

(58) Field of Classification Search
CPC ... B64C 2025/325; B64C 25/52; B64C 25/58; B64C 25/60; B64C 25/66
USPC ........................... 244/17.17, 100 R, 108, 131
See application file for complete search history.

(56) References Cited

U.S. PATENT DOCUMENTS

| 3,173,632 | A | * | 3/1965 | Woods ..................... B64C 25/52 244/100 R |
| 3,716,208 | A | * | 2/1973 | Fagan ...................... B64C 25/52 244/108 |
| 3,822,048 | A | | 7/1974 | Hartel |
| 4,270,711 | A | * | 6/1981 | Cresap .................... B64C 25/52 244/100 R |
| 4,519,559 | A | * | 5/1985 | Logan ..................... B64C 25/52 244/104 FP |
| 4,645,143 | A | | 2/1987 | Coffy |
| 5,211,359 | A | | 5/1993 | Rene et al. |
| 6,244,538 | B1 | | 6/2001 | Howard et al. |
| 7,770,843 | B2 | * | 8/2010 | Bietenhader ............ B64C 25/52 244/104 R |
| 9,085,361 | B2 | | 7/2015 | Prud'Homme-Lacroix |

(Continued)

FOREIGN PATENT DOCUMENTS

| EP | 0512898 | 11/1992 |
| FR | 2554210 | 5/1985 |
| FR | 2995874 | 3/2014 |

*Primary Examiner* — Richard R Green
*Assistant Examiner* — Brady W Frazier
(74) *Attorney, Agent, or Firm* — Brooks Kushman P.C.

(57) ABSTRACT

The invention relates to landing gear of an aircraft, the landing gear having skids and cross-members. The landing gear has at least one damper device arranged on at least one of the cross-members referred to as a "damped" cross-member. The damper device includes two stroke-transfer means hinged to the damped cross-member and to a fuselage of the aircraft. Each stroke-transfer means comprises a crank hinged to the damped cross-member and a link rod hinged to the crank and to the fuselage. A damper is hinged to each crank.

19 Claims, 2 Drawing Sheets

(56) References Cited

U.S. PATENT DOCUMENTS

| | | | |
|---|---|---|---|
| 2010/0237190 A1* | 9/2010 | Mouille | B64C 25/52 244/108 |
| 2013/0248650 A1* | 9/2013 | Gorlich | B64C 25/52 244/108 |
| 2014/0084109 A1* | 3/2014 | Prud'Homme-Lacroix | B64C 25/58 244/108 |
| 2015/0151836 A1* | 6/2015 | Prud'Homme-Lacroix | B64C 25/52 244/108 |
| 2015/0329203 A1* | 11/2015 | Oberinger | B64C 25/52 244/108 |

* cited by examiner

SKID LANDING GEAR HAVING AT LEAST ONE DAMPER, AND AIRCRAFT INCLUDING THE SKID LANDING GEAR

CROSS REFERENCE TO RELATED APPLICATION

This application claims priority to French patent application No. FR 14 02813 filed on Dec. 11, 2014, the disclosure of which is incorporated in its entirety by reference herein.

BACKGROUND OF THE INVENTION (1) Field of the Invention

The present invention relates to skid landing gear having at least one damper, and also to an aircraft including the landing gear. More precisely, the invention lies in the technical field of rotorcraft skid landing gear.

(2) Description of Related Art

Conventionally, a rotorcraft has landing gear by which the rotorcraft stands on the ground. More particularly, such landing gear includes "skid" landing gear having first and second longitudinal support skids. The skids are for coming into contact with the ground and they are arranged on either side of the fuselage of the rotorcraft. The first and second longitudinal support skids together define a plane referred for convenience as the "support plane".

The aircraft then stands on the ground via two elongate skids.

In order to connect each skid to the fuselage of the aircraft, the skid landing gear may be provided with first and second transverse cross-members, each interconnecting the first and second skids.

The first cross-member is said to be the "front" cross-member since the first cross-member connects the fuselage to zones that are situated towards the front of the first and second longitudinal skids. Conversely, the second cross-member is said to be the "rear" cross-member insofar as the second cross-member connects the fuselage to zones situated towards the rear ends of the first and second longitudinal skids.

The landing gear is then fastened to the aircraft via the front and rear cross-members. A cross-member is a frame of structure that extends transversely.

This kind of landing gear enables rotorcraft to stand on surfaces of a wide variety of types.

Furthermore, rotorcraft landing gear may be mainly subjected to two types of stresses during landing: vertical stress associated with vertical forces and movements that are directed in a vertical direction, and roll and pitching stresses that are associated with roll and pitching forces resulting from roll and pitching movements of the rotorcraft.

These stresses, in particular in roll and in pitching, can give rise to the ground resonance phenomenon on a rotorcraft that has a main rotor with hinged blades for providing it with lift.

Under certain very particular conditions, lead/lag resonance modes of the blades can become coupled in unstable manner with the movement of the rotorcraft fuselage in elastic deformation modes of the landing gear, in particular in roll: this gives rise to the phenomenon known to the person skilled in the art as "ground resonance".

During the ground resonance phenomenon, the blades are subjected to lead/lag movement, i.e. to movement in the plane of the rotor. This movement is out of phase among the various blades and therefore has the consequence of generating unbalance by shifting the center of gravity of the rotor away from the axis of rotation of the rotor.

This unbalance has the effect of causing a rotorcraft standing on the ground on its landing gear to be subjected to excitation (rotating force). This excitation causes the center of the rotor to move in the plane of the rotor and thus causes the fuselage to move. Under such circumstances, the movement of the center of the rotor once more excites lead/lag movement of the blades. The fuselage-and-rotor assembly then becomes a system that is fully coupled and divergent. Under certain conditions, the rotorcraft can overturn in only a few seconds in the absence of appropriate means or decisions.

Concerning these conditions, the rotor, when isolated from the fuselage, has its own lead/lag resonant frequency $\omega_\delta$. In a stationary reference frame and for the rotor rotating at a frequency $\Omega$, the excitation frequency due to the lead/lag movement of the blades (oscillations at their resonant frequency $\omega_\delta$) is equal to $|\Omega \pm \omega_\delta|$.

Under such circumstances, roll instability may occur in particular if the resonant frequency of the fuselage on its landing gear is close to $|\Omega - \omega_\delta|$.

In particular, the resonant frequency of a mode of vibration of the fuselage crossing the lead/lag resonant frequency of the blades generates coupling that is unstable if the damping of said mode of vibration of the fuselage, when coupled to the lead/lag mode of the blades, is negative.

In order to avoid instability, a manufacturer may seek to avoid these frequencies crossing or to obtain such a frequency crossing at a speed of rotation of the rotor that does not run any risk of leading to instability. In order to obtain this result, the manufacturer can adapt the stiffness in roll and/or in pitching of the landing gear.

Nevertheless, it can be difficult to adapt landing gear. In particular, a compromise needs to be found between firstly the vertical stiffness of the landing gear that governs comfort and the level of load imparted to the structure during a landing, and secondly the stiffnesses in pitching and in roll, which have a large influence on ground resonance behavior.

The person skilled in the art uses the term "vertical stiffness" to designate the stiffness of the landing gear under the effect of any vertical stress along the axis in elevation of the aircraft, and assuming the rotorcraft has an attitude that is static.

Skid landing gear is thus generally lengthy and difficult to develop. This development is therefore rarely put into question during the lifetime of the aircraft.

Nevertheless, substantial modifications to an aircraft may take place during its lifetime, e.g. leading to an increase in the weight of the aircraft. The resonant frequencies of the fuselage in roll and/or in pitching can then vary, thereby running the risk of the ground resonance phenomenon appearing.

Under such circumstances, a manufacturer may be tempted to modify the roll and/or pitching stiffnesses of the landing gear without having too much influence on the behavior of the aircraft, in particular while landing.

For this purpose, geometrical modifications may be made to a skid landing gear. Nevertheless, such geometrical modifications may suffer the drawback of modifying the vertical stiffness of the landing gear. The behavior of the landing gear may then in particular be impacted.

In order to avoid the ground resonance phenomenon then appearing, a manufacturer may seek to damp the vibration modes of the fuselage, specifically for the purpose of pushing back the stability limit to speeds of rotation of the rotor that cannot be reached while on the ground. This improvement in damping is also advantageous since it provides an improvement in robustness, but such positioning of the vibration mode frequency can sometimes be difficult to optimize for all of the configurations of the aircraft and for all types of ground landing that are possible for a rotorcraft (in particular landing on a slope).

For example, a damper is known that is arranged directly between a skid and a fuselage. The effectiveness of that device is moderate given the relatively small movement between two attachment points.

It is nevertheless difficult to add damping because of the small amplitudes of the movements of the landing gear relative to the fuselage. In addition, the arrangement of the damper can increase the loads exerted on the structure of the fuselage connected to the damper, and that can raise a problem when installing a damper on a structure that has not been designed for that purpose.

Document U.S. Pat. No. 6,244,538 describes landing gear.

That document makes it possible to position the resonant frequencies in roll and in pitching of the fuselage relative to the excitation frequencies as a function of the center of rotation defined by the support links.

Document FR 2 554 210 describes a flexible beam made of composite materials that is substantially in the form of an elongate box with a laminated structure. Two rigid soleplates are connected together by two webs.

A deformable energy-absorbing pad is arranged between the two soleplates and includes at least one block of elastomer material having high remanence in deformation.

The beam also has at least one viscoelastic damper mounted on the outside face of the soleplate. That damper is stressed in traction by links during bending deformation of the beam so as to produce damping that is additional to the damping provided by each energy absorber pad.

That configuration suggests using an elastomer within each cross-member and within each damper fastened under the cross-member.

Document U.S. Pat. No. 4,270,711 describes landing gear provided with a beam connected by a pivot to a cross-member of the landing gear in such a manner as to be capable of pivoting about an axis. The ends of the beam are then fastened to the structure of the aircraft.

Document U.S. Pat. No. 3,173,632 describes landing gear having two skids that are connected together by two torsion rods. Each torsion rod is secured to two arms, each arm being hinged to an upright bracket extending in elevation from a skid.

Furthermore, movement-preventing means can allow or prevent each torsion rod from pivoting about its axis of symmetry.

Document FR 2 995 874 describes aircraft landing gear having first and second skids together with two cross-members. Each cross-member comprises a first branch secured to the first skid and a second branch secured to the second skid, together with a central portion that is secured to the first and second branches, which are branches that extend downwards. The landing gear has at least one stiffener with at least one link and at least one means for limiting deformation in roll of the central portion of a cross-member, each limitation means being secured to said central portion of the cross-member, at least one main hinge hinging each link to said limitation means and a secondary hinge hinging each link to a point that is outside the central portion in order to limit the deformation of the central portion as a result of roll movement of an aircraft.

Landing gear is also known that has first and second skids, a front cross-member, and a rear cross-member. That landing gear includes at least one stiffener arranged on a cross-member, said stiffener having two rockers, each rocker having an outer end secured to the cross-member. The landing gear includes two hinge means for hinging each rocker to a carrier structure and an elongate link member extending from a first end of the hinged connection to the first rocker to a second end of the hinged connection to the second rocker.

Those rockers therefore seek to stiffen the cross-member.

Also known is Document U.S. Pat. No. 4,519,559.

Documents EP 0 512 898, U.S. Pat. No. 3,822,048, and U.S. Pat. No. 3,716,208 are also known.

BRIEF SUMMARY OF THE INVENTION

An object of the present invention is thus to provide skid landing gear having at least one damper seeking to reduce the risk of the ground resonance phenomenon appearing as a result of a roll movement.

According to the invention, landing gear of an aircraft is provided with a first longitudinal support skid and a second longitudinal support skid together with a cross-member referred to as a "front" cross-member and a cross-member referred to as a "rear" cross-member, each cross-member extending transversely between the first skid and the second skid.

The landing gear has at least one damper device arranged on at least one of said cross-members that is referred to, for convenience, as a "damped" cross-member, the damper device comprising:
  stroke-transfer means referred to as "first" stroke-transfer means and stroke-transfer means referred to as "second" stroke-transfer means in order to transfer, possibly with scaling, the roll movement of the fuselage, each stroke-transfer means being hinged to the damped cross-member and being suitable for being hinged to a fuselage of the aircraft;
  each stroke-transfer means comprising:
    a crank hinged to said damped cross-member by a hinge referred to as a "first" hinge defining a first longitudinal pivot axis, said crank being provided with a first segment extending from a first free end to a first root, said crank being provided with a second segment extending from a second free end to a second root secured to the first root, said first free end having a hinge referred to as a "second" hinge defining a second longitudinal pivot axis; and
    a link rod extending from a first end zone to a second end zone, said first end zone being hinged to said second free end by a hinge referred to as a "third" hinge defining a third longitudinal pivot axis, said second end zone having a hinge suitable for being fastened to said fuselage and referred to as a "fourth" hinge, defining a fourth longitudinal pivot axis; and
  a damper hinged to the second hinge of the first stroke-transfer means and to the second hinge of the second stroke-transfer means.

The stroke-transfer means thus comprise a member having both a link rod and a crank for transmitting movement of the fuselage to the damper.

Depending on the variant, one cross-member has a damper device of the above-described type, or else each cross-member has a respective such damper device.

A hinge that defines a pivot axis must be understood as representing a member that allows relative movement with at least one degree of freedom in pivoting between two bodies about the pivot axis. For example, a ball bearing allows rotation about a single axis of rotation. In contrast, a ball-joint hinge allows pivoting about three axes of rotation that are different and that intersect in a common center of rotation.

The cranks are fastened to the cross-members rather than to some other zone of the structure in order to limit local deformations that might tend to reduce the movements obtained at the attachment points of the damper, which would tend to reduce the effectiveness of the system.

The hinge referred to as a "first" hinge of stroke-transfer means serves under such conditions to allow relative movement in pivoting with at least one degree of freedom between the crank of the stroke-transfer means and the damped cross-member.

The hinge referred to as the "second" hinge of stroke-transfer means enables relative pivoting with at least one degree of freedom between the link rod of the stroke-transfer means and the damper.

The hinge referred to as the "third" hinge of a stroke-transfer means enables relative pivoting with at least one degree of freedom between the crank and the link rod of the stroke-transfer means.

The hinge referred to as the "fourth" hinge of a stroke-transfer means enables relative pivoting with at least one degree of freedom between the link rod of the stroke-transfer means and the fuselage of an aircraft. More particularly, each fourth hinge hinges a stroke-transfer means to a frame of a fuselage.

The term "free end" should be understood broadly as representing an end zone of the associated member that includes an end proper of that member.

The damper device then tends to provide damping for modes of vibration in roll, without putting constraint on the dimensioning of the carrier structure of the fuselage by added weight associated with the presence of the damper.

During a roll movement of the fuselage on the ground, the fourth hinges of both stroke-transfer means of a damper device of the invention move in opposite directions. The linkage of the stroke-transfer means then causes the second hinges of the two stroke-transfer means to move in two opposite directions.

Consequently, since the damper extends between those two hinges, it produces damping of those movements by being stressed or compressed.

The damper device thus provides damping on the roll mode of vibration that could lead to the ground resonance phenomenon appearing.

In addition, the amplitude of the movements of the landing gear relative to the fuselage can be small. Consequently, the stroke-transfer means can increase those amplitudes in order to apply stress to the damper in optimum manner.

In contrast, during vertical movement of the fuselage or pitching movement on the aircraft landing, the fourth hinges of both stroke-transfer means may move in the same manner. Consequently, the second hinges of both stroke-transfer means also move in the same manner. Consequently, the damper between those two second hinges is not stressed.

Under such circumstances, the device does not tend to apply a force to the fuselage during a landing that takes place at considerable vertical speed. Likewise, when the aircraft has a pitching response, the damper does not produce any damping.

Consequently, the damper device does not lead to unwanted stresses being generated during those two situations.

Consequently, the invention tends to limit any risk of ground resonance appearing as the result of roll movement of the fuselage on the ground, in particular by having a limited impact on the operation of the aircraft, e.g. when landing at high speed.

The invention thus tends to minimize local deformations of the carrier structure of the fuselage or of the landing gear during such a landing. The invention can thus be implemented on an existing aircraft with limited impact on the dimensioning of its carrier structure.

The invention is thus adaptable on a variety of aircraft.

The landing gear may also include one or more of the following characteristics.

For example, the first stroke-transfer means and the second stroke-transfer means may be identical.

The link rod and the crank of the first stroke-transfer means are thus respectively identical to the link rod and the crank of the second stroke-transfer means.

This characteristic makes it easier to obtain identical movements of the fourth hinges of both stroke-transfer means of a device during vertical landing.

Furthermore, a first distance in elevation lies between the first pivot axis of one of said stroke-transfer means and the second pivot axis of that stroke-transfer means, a second distance in elevation lies between the third pivot axis of that stroke-transfer means and the fourth pivot axis of that stroke-transfer means, and the first distance in elevation is greater than said second distance in elevation.

In another aspect, at least one of said hinges is a ball-joint hinge.

In particular, all of the hinges are ball-joint hinges.

Using ball-joint hinges makes it possible to accommodate small misalignments, where such misalignments could stress a pivot connection.

The hinges preferably present some minimum amount of clearance and friction in order to guarantee proper operation, of the system. This clearance is established by the manufacturer in conventional manner.

Nevertheless, in another alternative, at least one of said hinges comprises a laminated bearing.

Furthermore, at least one crank is L-shaped. Thus, a first segment of the crank represents one branch of the L-shape, while the second segment forms the other branch of the L-shape.

Furthermore, the first hinge of a crank is optionally connected to a junction between the first root and the second root of that crank.

When the crank is L-shaped with two branches that meet at a junction forming a right angle, the first hinge is connected to the junction.

Furthermore, a first distance in elevation lies between the first pivot axis of one of said stroke-transfer means and the second pivot axis of that stroke-transfer means, a transverse length lies between the first pivot axis of that stroke-transfer means and the third pivot axis of that stroke-transfer means, and said first distance is equal to said transverse length.

Thus, the first segment and the second segment of a crank are of the same.

Nevertheless, the first distance and the transverse length may be different.

A large ratio between the first distance and the transverse length thus makes it possible to increase the movement generated in the damper and thus increase its effectiveness. In simplified manner, considering an installation that is symmetrical, the damping provided is substantially proportional to this ratio squared.

By varying this ratio, a manufacturer can thus adjust the damper device in order to obtain the required damping.

In another aspect, the first stroke-transfer means and the second stroke-transfer means are arranged on either side of an antero-posterior plane of symmetry of the damped cross-member.

With this arrangement, pivoting of the fuselage relative to the landing gear about a longitudinal roll axis close to the antero-posterior plane of symmetry gives rise to opposite movements of the second hinge of the first stroke-transfer means and the second hinge of the second stroke-transfer means.

In another aspect, the second segment of said first stroke-transfer means extends transversely from the first hinge of the first stroke-transfer means towards an antero-posterior plane of symmetry of said damped cross-member, the second segment of said second stroke-transfer means extending transversely from the first hinge of the second stroke-transfer means away from said antero-posterior plane of symmetry.

Consequently, the antero-posterior plane of symmetry of the damped cross-member does not represent a plane of symmetry of the first stroke-transfer means relative to the second stroke-transfer means.

Furthermore, the second segment of the first stroke-transfer means is arranged, while in flight, in alignment with the second segment of the second stroke-transfer means.

In addition, the first segment of the first stroke-transfer means, the first segment of the second stroke-transfer means, the link rod of the first stroke-transfer means, and the link rod of said second stroke-transfer means, when in flight, are parallel to one another.

Furthermore, the damped cross-member has a first downward branch secured to the first skid and a second downward branch secured to the second skid, with a substantially horizontal central portion that extends between the first and second branches, and each stroke-transfer means is hinged to the central portion.

For example, each stroke-transfer means is hinged to the central portion as close as possible to a downward branch in order to maximize stress on the damper.

Furthermore, the damped cross-member may have only one fastener system for fastening to said fuselage.

Such a fastener system allows the fuselage to pivot relative to the landing gear. Reference may be made to the literature in order to find examples of fastener systems of this type.

Under such circumstances, the landing gear may be fastened to the fuselage by means of three fastener systems. More precisely, one cross-member is attached to the fuselage by two fastener systems, and the other cross-member is fastened to the fuselage by a single fastener system.

Consequently, at least one damper device is arranged on the cross-member that is fastened to the fuselage by a single fastener system. The amplitudes of the movements that occur during movement in roll between the fuselage and the landing gear are then greater on such a cross-member, thereby serving to maximize the resulting damping.

Nevertheless, the damped cross-member may have two fastener systems for fastening to the fuselage.

The damper device can still function, but with effectiveness that is reduced compared with the previously-mentioned situation, since the amplitude of relative movement between the fuselage and the landing gear is smaller with such a cross-member.

In another aspect, the damper may be a hydraulic damper.

The damper is of the hydraulic type in order to maximize its damping contribution.

In another alternative, the damper is a damper including a viscoelastic member.

The damper is then of the viscoelastic type. Such a damper provides stiffness in addition to damping. Such a damper may then be used for increasing the frequency of the mode of vibration in roll, should that be necessary.

In addition to landing gear, the invention provides an aircraft having a fuselage. The aircraft then has landing gear of the invention attached to the fuselage, with each third hinge being hinged to the fuselage. In particular, each cross-member of the landing gear is attached to a frame of the fuselage.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which.

Elements shown in more than one of the figures are given the same references in each of them.

DETAILED DESCRIPTION OF THE INVENTION

It should be observed that three mutually orthogonal directions X, Y, and Z are shown in the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

Figure 1:
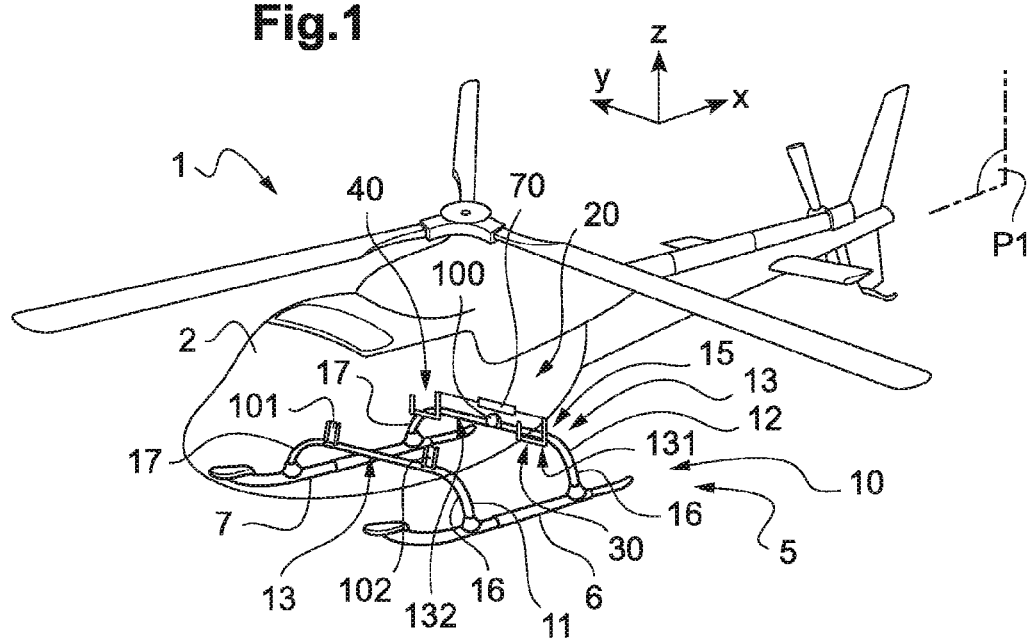
FIG. 1 is a diagram showing an aircraft of the invention.

FIG. 1 shows an aircraft 1, and more particularly a rotorcraft.

This aircraft 1 has a fuselage 2 that extends longitudinally along an antero-posterior plane of symmetry P1. In addition, the fuselage 2 is secured to skid landing gear 5. Specifically, the landing gear 5 is attached to frames 3 of the fuselage 2, as can be seen in FIGS. 2 to 5.

It should be observed that a portion of the fuselage 2 is shown transparently in FIG. 1 in order to be able to see the landing gear 5.

The landing gear 5 has a first longitudinal support skid 6 and a second longitudinal support skid 7.

Under such circumstances, the landing gear has two transverse cross-members 10 interconnecting the first and second skids 6 and 7, namely a front transverse cross-member 11 and a rear transverse cross-member 12.

Each cross-member 10 has a first branch 16 that is secured to the first skid 6 and a second branch 17 that is secured to the second skid 7.

In addition, each cross-member shown diagrammatically is continuous, comprising a central portion 13 that is secured both to the first branch 16 and to the second branch 17, both of which extend downwards. The branches are sometimes referred to as "downward branches" insofar as these branches extend from the central portion towards a skid by coming closer to the ground.

Each central portion may be subdivided into a first lateral segment 131 connected to the first downward branch and a second lateral segment 132 connected to the second downward branch, the first lateral segment 131 and the second lateral segment 132 being connected together in the antero-posterior plane of symmetry P1.

Independently of the invention, the landing gear 5 is then connected to the carrier structure of the aircraft. Each cross-member may thus be fastened by way of example to a frame of the aircraft by at least one fastener system. Thus, one cross-member is fastened to a frame by two fastener systems 101 and 102, while the other cross-member is fastened to another frame by at least one fastener system 100.

In the invention, the landing gear 5 is provided with at least one damper device 20 co-operating with a cross-member 10. A cross-member 10 co-operating with a damper device is referred to for convenience as a "damped cross-member" 15, for ease of identification.

A damper device 20 is shown simply in diagrammatic manner on the rear cross-member in FIG. 1 so as to avoid overcrowding the figure.

Figure 2:
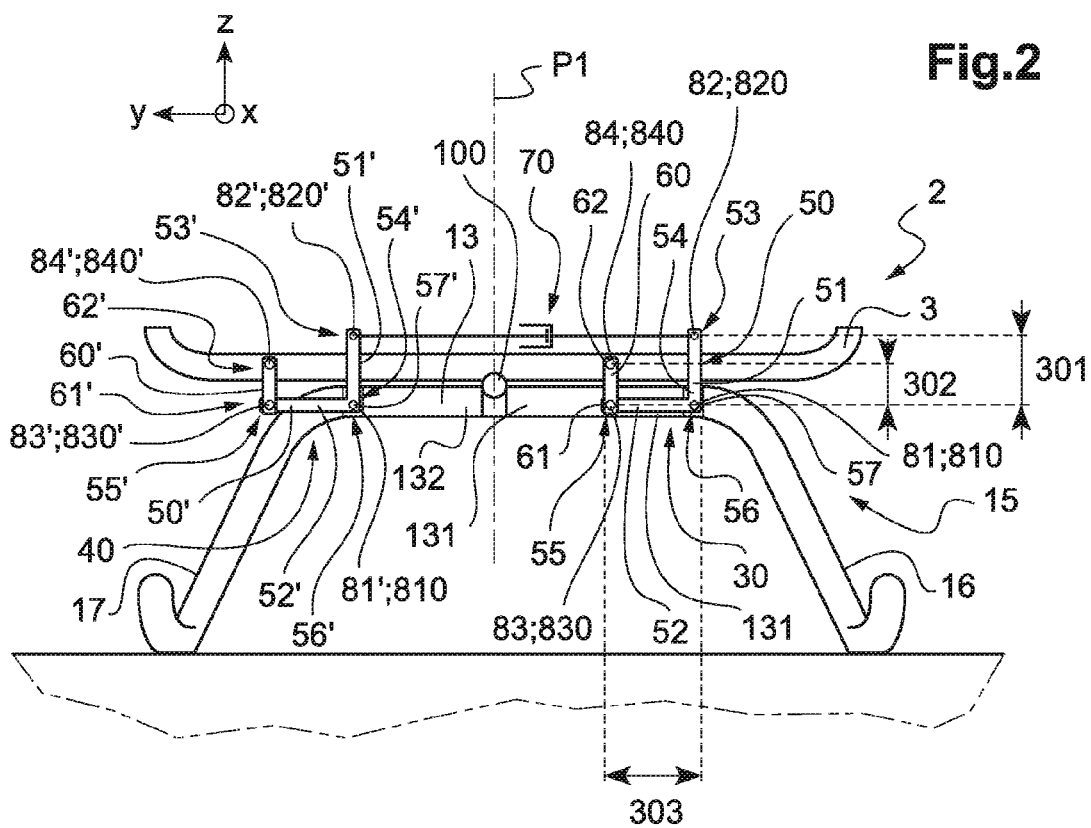
FIG. 2 is a diagram showing landing gear of the invention at rest, i.e. landing gear that is not standing on the ground and that is therefore not deformed.
Figure 3:
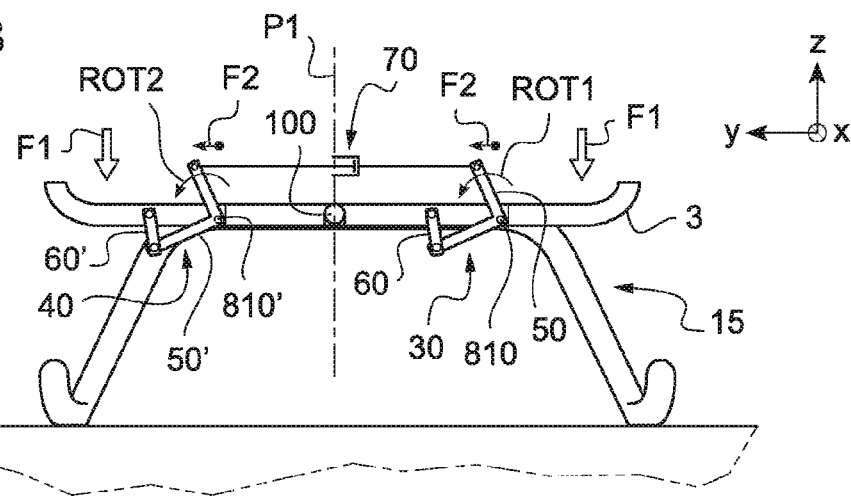
FIG. 3 is a diagram showing landing gear of the invention that is stressed vertically during a landing.
Figure 4:
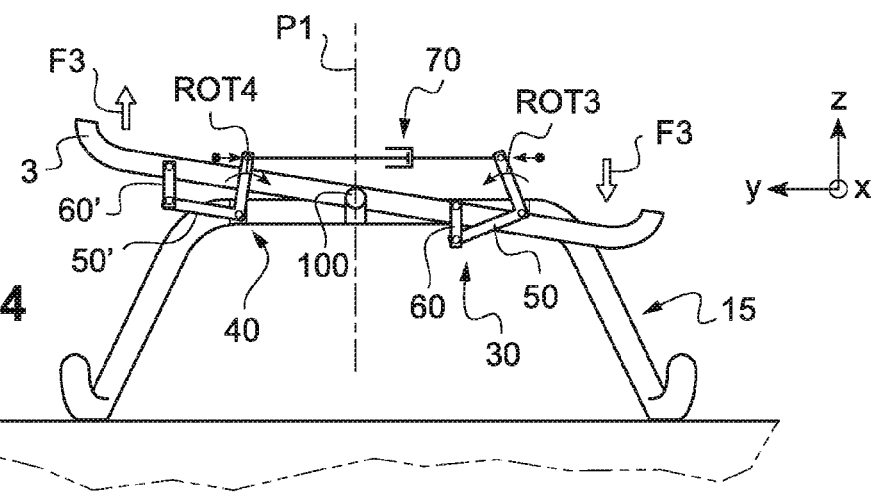
FIG. 4 is a diagram of landing gear of the invention that is stressed in roll during landing.

In the variant of FIGS. 2 to 4, the damped cross-member may have a single fastener system 100 in order to be fastened to the fuselage.

Figure 5:
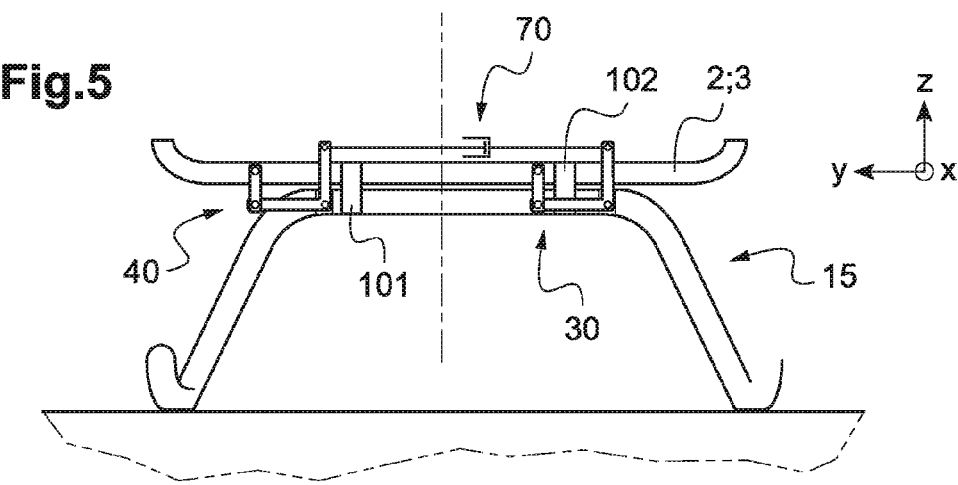
FIG. 5 is a view of a damper device co-operating with a cross-member connected to a fuselage by two fastener systems.

In contrast, in the variant of FIG. 5, the damped cross-member 15 has two fastener systems 101 and 102 for fastening to the fuselage.

Independently of the variant, and with reference to FIG. 2, a damper device 20 has at least two stroke-transfer means referred to respectively as the "first" stroke-transfer means 30 and as the "second" stroke-transfer means 40.

The first stroke-transfer means 30 and the second stroke-transfer means 40 are hinged respectively to the damped cross-member 15 and to the fuselage 2, in particular to a frame 3 of the fuselage 2.

In addition, each stroke-transfer means 30 and 40 has a crank 50, 50' hinged to the damped cross-member 15. Furthermore, each stroke-transfer means 30, 40 has a link rod hinged firstly to the fuselage and secondly to the crank of the corresponding stroke-transfer means 30, 40.

Each crank 50, 50' is thus hinged to the damped cross-member 15 by a hinge referred to as the "first" hinge 81, 81' defining at least a first longitudinal pivot axis 810, 810'.

Each first hinge may comprise a ball-joint hinge or an laminated bearing, for example.

In conventional manner, a ball-joint hinge comprises a partially-spherical ball arranged in a cage. The cage is fastened to a first member and the ball is fastened to a second member that is movable relative to the first member. Reference may be made to the literature in order to obtain descriptions of ball-joint hinges.

A laminated bearing comprises a member made up of a succession of rigid layers and of resilient layers based on elastomer, for example. Reference may be made to the literature for obtaining descriptions of laminated bearings.

Furthermore, each crank has a first segment 51, 51' and a second segment 52, 52' that are at an angle relative to each other.

By way of example, this angle is a right angle. Consequently, the crank then constitutes an L-shaped bracket.

More precisely, the first segment 51, 51' of a crank extends from a first free end 53, 53' to a first root 54, 54'.

Each first free end 53, 53' is then connected to a hinge referred to as a "second" hinge 82, 82' that defines at least one longitudinal pivot axis 820, 820'. Each second hinge may comprise a ball-joint hinge or a laminated bearing, for example.

The second segment 52, 52' of the crank also extends from a second free end 55 to a second root 56 that is secured to the first root 54 at a junction 57, 57'.

The first hinge 81, 81' of the crank to a damped cross-member is then provided at this junction 57, 57', for example.

Under such circumstances, each link rod 60, 60' extends from a first end zone 61, 61' to a second end zone 62, 62'. The first end zone 61, 61' of a link rod is then hinged to the second free end 55, 55' of a crank by a hinge referred to as a "third" hinge 83, 83' defining at least a third longitudinal pivot axis 830, 830'. Each third hinge may comprise a ball-joint hinge or a laminated bearing, for example.

Finally, the second end zone 62, 62' has a hinge that is fastened to the fuselage 2 and referred to as the "fourth" hinge 84. This fourth hinge 84 defines a fourth longitudinal pivot axis 840, 840'. Each fourth hinge may comprise a ball-joint hinge or a laminated bearing, for example.

Consequently, the first stroke-transfer means 30 comprise a crank 50 hinged to the damped cross-member about a first pivot axis 810 by a first hinge 81. Furthermore, the first stroke-transfer means 30 includes a link rod hinged by a third hinge 83 to the crank 50 about a third pivot axis 830. In addition, the link rod is hinged to the fuselage by a fourth hinge 84 about a fourth pivot axis 840.

Likewise, the second stroke-transfer means 40 comprises a crank 50' hinged to the damped cross-member about a first pivot axis 810' by a first hinge 81'. In addition, the second stroke-transfer means 40 has a link rod hinged by a third hinge 83' to the crank 50' about a third pivot axis 830'. In addition, the link rod is hinged to the fuselage by a fourth hinge 84' about a fourth pivot axis 840'.

Furthermore, the first stroke-transfer means 30 and the second stroke-transfer means 40 may be identical.

In addition, the first stroke-transfer means 30 and the second stroke-transfer means 40 may optionally be arranged on either side of an antero-posterior plane of symmetry P1 of the damped cross-member 15.

The damped cross-member 15 of FIG. 2 possesses a first downward branch 16 that is secured to the first skid 6 and a second downward branch 17 that is secured to the second skid 7, together with a central portion 13 extending between the first and second branches 16 and 17. Each stroke-transfer means 30, 40 is then hinged to said second central portion 13. More precisely, the first stroke-transfer means 30 is hinged to the first lateral segment 131 of the central portion that is connected to the first downward branch 15, and the second stroke-transfer means 40 is hinged to the second lateral segment 132 of the central portion that is connected to the second downward branch 17.

Under such circumstances, the second segment 52 of the first stroke-transfer means 30 extends, e.g. transversely, from the first hinge 81 of the first stroke-transfer means 30 towards an antero-posterior plane of symmetry P1 of the damped cross-member 15. In contrast, the second segment 52' of the second stroke-transfer means 40 extends transversely from the first hinge 81' of the second stroke-transfer means 40 away from said antero-posterior plane of symmetry P1.

Furthermore, each stroke-transfer means may be substantially U-shaped when the landing gear is not resting on the ground.

Under such circumstances, the second segment 52 of the first stroke-transfer means 30 in flight is arranged in line with the second segment 52' of the second stroke-transfer means.

Furthermore, the first segment 51 of the first stroke-transfer means 30, the first segment 51' of the second stroke-transfer means 40, the link rod 60 of the first stroke-transfer means 30, and the link rod 60' of the second stroke-transfer means 40 when in flight are parallel to one another and substantially vertical. Conversely, the central portion is substantially horizontal.

In addition, at least one stroke-transfer means may present particular dimensions. These dimensions are shown in FIG. 2 for the first stroke-transfer means. Nevertheless, the second stroke-transfer means could also present the following characteristics.

Thus, in a section in elevation in the YZ plane of the sheet containing FIG. 2, a first distance 301 in elevation lies between the first pivot axis 810 of one of the stroke-transfer means 30 and the second pivot axis 820 of the stroke-transfer means 30.

Furthermore, a second distance 302 in elevation extends between said third pivot axis 830 of the stroke-transfer means 30 and the fourth pivot axis 840 of the stroke-transfer means 30.

Under such circumstances, the first distance 301 in elevation is potentially greater than the second distance 302 in elevation.

Furthermore, a transverse length 303 lies between the first pivot axis 810 of the stroke-transfer means 30 and the third pivot axis 830 of the stroke-transfer means 30.

Consequently, the first distance 301 may possibly be equal to said transverse length 303.

Furthermore, each damper device 20 includes a damper 70. The damper 70 is then hinged to the second hinge 82 of the first stroke-transfer means 30 of the damper device and to the second hinge 82' of the second stroke-transfer means 40 of the damper device.

The damper 70 may be either a hydraulic damper or else a damper including a viscoelastic member. Such a hydraulic damper may contain a piston defining at least one chamber filled with a fluid. A viscoelastic type damper may comprise for example a piston in contact against a viscoelastic member.

FIGS. 3 to 4 show the operation of the invention.

During a vertical landing as shown in FIG. 3, the fuselage tends to come closer to the damped cross-member by moving vertically along arrow F1.

This movement gives rise to identical movements of the link rods 60, 60' of the stroke-transfer means 30, 40. Consequently, the cranks 50, 50' of the stroke-transfer means 30, pivot with two identical rotations ROT1, ROT2 about their respective first pivot axes.

The damper 70 is then moved in translation along arrows F2 without being compressed or extended.

During a roll movement as shown in FIG. 4, the fuselage tends to be inclined relative to the damped cross-member, with this roll movement being illustrated by arrows F3.

The link rods 60, 60' remain in a position that is substantially vertical.

In contrast, the cranks 50, 50' of the stroke-transfer means 30, 40 pivot with two opposite rotations ROT3, ROT4 about their respective first pivot axes.

The damper 70 is then either extended or compressed in the embodiment shown in FIG. 4.

Naturally, the present invention may be subjected to numerous variations as to its implementation. Although several embodiments are described, it can readily be understood that it is not conceivable to identify exhaustively all possible embodiments. It is naturally possible to envisage replacing any of the means described by equivalent means without going beyond the ambit of the present invention.

For example, the damped cross-member may be a discontinuous cross-member. Such a discontinuous cross-member may have a central portion made up of two segments that are transversely separate from each other.

What is claimed is:

1. Landing gear for an aircraft, the landing gear having a first longitudinal support skid and a second longitudinal support skid together with a cross-member referred to as a "front" cross-member and a cross-member referred to as a "rear" cross-member, each cross-member extending transversely between the first skid and the second skid, the landing gear having at least one damper device arranged on at least one of the cross-members that is referred to as a "damped" cross-member, wherein the damper device comprises:

stroke-transfer means referred to as "first" stroke-transfer means and stroke-transfer means referred to as "second" stroke-transfer means, each stroke-transfer means being hinged to the damped cross-member and being suitable for being hinged to a fuselage of the aircraft;

each stroke-transfer means comprising:

a crank hinged to the damped cross-member by a hinge referred to as a "first" hinge defining a first longitudinal pivot axis, the crank being provided with a first segment extending from a first free end to a first root, the crank being provided with a second segment extending from a second free end to a second root secured to the first root, the first free end having a hinge referred to as a "second" hinge defining a second longitudinal pivot axis; and a link rod extending from a first end zone to a second end zone, the first end zone being hinged to the second free end by a hinge referred to as a "third" hinge defining a third longitudinal pivot axis, the second end zone having a hinge suitable for being fastened to the fuselage and referred to as a "fourth" hinge which defines a fourth longitudinal pivot axis; and a damper hinged to the second hinge of the first stroke-transfer means and to the second hinge of the second stroke-transfer means.

2. Landing gear according to claim 1, wherein the first stroke-transfer means and the second stroke-transfer means are identical.

3. Landing gear according to claim 1, wherein a first distance in elevation lies between the first pivot axis of one of the stroke-transfer means and the second pivot axis of that stroke-transfer means, a second distance in elevation lies between the third pivot axis of that stroke-transfer means and the fourth pivot axis of that stroke-transfer means, and the first distance in elevation is greater than the second distance in elevation.

4. Landing gear according to claim 1, wherein at least one of the hinges is a ball joint hinge.

5. Landing gear according to claim 1, wherein at least one of the hinges comprises a laminated bearing.

6. Landing gear according to claim 1, wherein at least one crank is L-shaped.

7. Landing gear according to claim 1, wherein the first hinge of each crank is connected to a junction between the first root and the second root of that crank.

8. Landing gear according to claim 1, wherein a first distance in elevation lies between the first pivot axis of one of the stroke-transfer means and the second pivot axis of that stroke-transfer means, a transverse length lies between the first pivot axis of that stroke-transfer means and the third pivot axis of that stroke-transfer means, and the first distance is equal to the transverse length.

9. Landing gear according to claim 1, wherein a first distance in elevation lies between the first pivot axis of one of the stroke-transfer means and the second pivot axis of that stroke-transfer means, a transverse length lies between the first pivot axis of that stroke-transfer means and the third pivot axis of that stroke-transfer means, and the first distance is different to the transverse length.

10. Landing gear according to claim 1, wherein the first stroke-transfer means and the second stroke-transfer means are arranged on either side of an antero-posterior plane of symmetry of the damped cross-member.

11. Landing gear according to claim 1, wherein the second segment of the first stroke-transfer means extends transversely from the first hinge of the first stroke-transfer means towards an antero-posterior plane of symmetry of the damped cross-member, the second segment of the second stroke-transfer means extending transversely from the first hinge of the second stroke-transfer means away from the antero-posterior plane of symmetry.

12. Landing gear according to claim 1, wherein the second segment of the first stroke-transfer means is arranged, while in flight, in alignment with the second segment of the second stroke-transfer means.

13. Landing gear according to claim 1, wherein the first segment of the first stroke-transfer means, the first segment of the second stroke-transfer means, the link rod of the first stroke-transfer means, and the link rod of the second stroke-transfer means, when in flight, are parallel to one another.

14. Landing gear according to claim 1, wherein the damped cross-member has a first downward branch secured to the first skid and a second downward branch secured to the second skid, with a central portion that extends between the first and second branches, and each stroke-transfer means is hinged to the central portion.

15. Landing gear according to claim 1, wherein the damped cross-member has a single fastener system for fastening to the fuselage.

16. Landing gear according to claim 1, wherein the damped cross-member has two fastener systems for fastening to the fuselage.

17. Landing gear according to claim 1, wherein the damper is a hydraulic damper.

18. Landing gear according to claim 1, wherein the damper is a damper including a viscoelastic member.

19. An aircraft having a fuselage, wherein the aircraft includes landing gear according to claim 1 attached to the fuselage, each fourth hinge being hinged to the fuselage.

* * * * *